US005195796A

United States Patent [19]

Wampler, II

[11] Patent Number: 5,195,796

[45] Date of Patent: Mar. 23, 1993

[54] DECK LID HINGE ASSEMBLY

[75] Inventor: Charles W. Wampler, II, Birmingham, Mich.

[73] Assignee: General Motors Corporation, Detroit, Mich.

[21] Appl. No.: 840,218

[22] Filed: Feb. 24, 1992

[51] Int. Cl.[5] .......... B62D 25/10

[52] U.S. Cl. .......... 296/76; 49/386; 16/358

[58] Field of Search .......... 296/76; 49/386; 16/358

[56] References Cited

U.S. PATENT DOCUMENTS

| | | | |
|---|---|---|---|
| 4,069,550 | 1/1978 | Silk et al. | 16/179 |
| 4,188,684 | 2/1980 | Pennec | 16/128.1 |
| 4,206,944 | 6/1980 | Kumagai et al. | 296/76 |
| 4,223,483 | 9/1980 | Stafford | 49/386 |
| 4,383,347 | 5/1983 | La Conte | 16/360 |
| 4,402,111 | 9/1983 | Selby et al. | 16/308 |
| 4,580,315 | 4/1986 | Beckwith | 16/308 |
| 4,587,760 | 5/1986 | Brissette | 49/252 |
| 4,738,003 | 4/1988 | Mori et al. | 16/321 |
| 4,856,142 | 8/1989 | Fukunaga | 296/76 X |
| 5,029,930 | 7/1991 | Ihrke et al. | 296/76 |

FOREIGN PATENT DOCUMENTS

| | | | |
|---|---|---|---|
| 1008003 | 10/1965 | United Kingdom | 296/76 |

OTHER PUBLICATIONS

E. A. Dijksman, "Motion Geometry of Mechanisms", 1976 pp. 16–18 and associated figures.

*Primary Examiner*—Charles A. Marmor
*Assistant Examiner*—Joseph D. Pape
*Attorney, Agent, or Firm*—Raymond I. Bruttomesso, Jr.

[57] ABSTRACT

A hinge assembly for mounting to a body structure of a vehicle a movable closure panel granting access to a compartment. A compact area in the compartment is defined by a partition dividing from the passenger compartment, a leading edge of the closure panel and a raised floor in the compartment. The hinge assembly has a bracket mounted to the body structure in the compact area of the compartment and projecting under the leading edge of the closure panel. The bracket has a pair of plates each having a guide slot. A hinge strap is interposed between the two plates of the bracket and has an end secured to the closure panel near the leading edge. A first guide roller is carried by the other end of the hinge strap and is slideably received by one of the guide slots for slideable movement of the other end of the hinge strap relative to the body structure. A second guide roller is carried by a connection point, located between the two ends of the hinge strap, and is slideably received by the other guide slot for slideable movement of the connection point relative to the body structure so that the hinge strap rotates relative to the body structure as the hinge strap slideably move. As the closure panel moves from the closed position to the open position, the leading edge of the closure panel shifts away from the body structure.

4 Claims, 2 Drawing Sheets

DECK LID HINGE ASSEMBLY

BACKGROUND OF THE INVENTION

1. Field of the Invention

This invention relates to a hinge assembly for a deck lid and more particularly to a gooseneck hinge that slides relative to the vehicle body.

2. Description of the Relevant Art

It is known to have a deck lid hingedly connected to a vehicle body. The deck lick is secured to a first end of a conventional gooseneck hinge strap. A second end of the gooseneck hinge strap is pivotably connected to the vehicle body. The deck lid and gooseneck hinge strap rotate about the second end of the gooseneck between a closed position with the deck lid covering a compartment and an opened position with the deck lid rotating upward granting access to the compartment.

It has also been recognized that it is sometimes desirable to shift the forward edge of the deck lid longitudinally rearward as the deck lid moves upward. This is most commonly found on a vehicle where the deck lid is not spaced from the rear window by a spacer panel. This rearward movement prevents interference of the deck lid with the adjacent rear window of the vehicle. U.S. Pat. No. 4,223,483 to Stafford provides a hinge assembly which moves the forward edge of the deck lid rearward from the rear window. Stafford has a hinge assembly with a hinge arm 36 mounted to the deck lid 28 and a roller on the end of a hinge arm 36 rides in a horizontal guide track 60. A torsion bar 64 secured to the deck lid 28 has its lower end pivoted to the body structure at a fixed point located rearward of where the hinge mechanism is mounted to the deck lid. U.S. Pat. No. 4,587,760 to Brissette also provides a hinge assembly which moves the deck lid rearward from the rear window and additionally the forward edge of the deck lid never moves forward of its closed position. The hinge assembly of Brissette has a pair of horizontal guide tracks 22 and 24 and sliding pivots cooperating with an interconnected hinge strap 26, control link 50 and follower link 38 to shift the edge of the deck lid away from the rear window 14 as the deck lid 16 is initially raised. The horizontal guide track 24 is located rearward of where the hinge assembly is mounted to the deck lid. Stafford and Brissette have components of the hinge assembly that extend further into the compartment than where the hinge assembly is mounted to the deck lid. In addition, both have multiple linkages that move to achieve the rotation of the deck lid.

With decreasing vehicle sizes, it has become necessary to accommodate vehicle components such as the deck lid hinge in ever decreasing space. The size and shape of the deck lid and the size and shape of the compartment or trunk on some designs prohibit the use of the conventionally mounted gooseneck hinge strap because of interference with other components, such as the housing for the suspension system. Furthermore, to maximize the usable space in the compartment it is desirable to minimize the space occupied by the hinge assembly.

It would be desirable to have a hinge assembly that rotates the deck lid about a shifting axis taking minimal space from the compartment or trunk.

SUMMARY OF THE INVENTION

This invention provides a hinge assembly for an automotive vehicle having a body structure and a closure panel movable from a generally horizontal closed position to an open position to access a luggage compartment. The closure panel has a forward edge that extends generally parallel to a lower edge of a window with a pair of wing tips formed at the corners of the forward edge of the closure panel in proximity to the lower corners of the window. The hinge assembly has a bracket mounted to the body structure in the luggage area and which projects under the forward edge of the closure panel. The bracket has a pair of plates depending downward with each plate having a guide slot. A hinge strap is interposed between the two plates of the bracket and has a first end secured to the closure panel near the forward edge. The hinge strap has a second end and a connection point, which is located between the first end and the second end. A first guide roller is carried by the second end of the hinge strap and is slideably received by one of the guide slots for slideable movement of the second end of the hinge strap relative to the body structure. A second guide roller is carried by the connection point of the hinge strap and slideably received by the other guide slot for slideable movement of the connection point relative to the body structure so that the hinge strap rotates relative to the body structure as the second end and the connection point of the hinge strap slidably move. As the closure panel moves from the closed position to the open position, the forward edge and the wing tips move rearward away from the window.

One object, feature and advantage resides in the provision of a hinge assembly which is capable of moving the edge of the closure panel and the wind tips upward while occupying a minimal space in the luggage compartment or trunk.

Another object, feature and advantage resides in the provision of a hinge assembly having few moving components.

Another object, feature and advantage resides in the provision of a vehicle hinge assembly where an initial instantaneous center of rotation is forward of the wind tip of the closure panel when the closure panel moves initially from a closed position.

Further objects, features and advantages of the present invention will become more apparent to those skilled in the art as the nature of the invention is better understood from the accompanying drawings and detailed description.

DESCRIPTION OF THE PREFERRED EMBODIMENT

Figure 1:
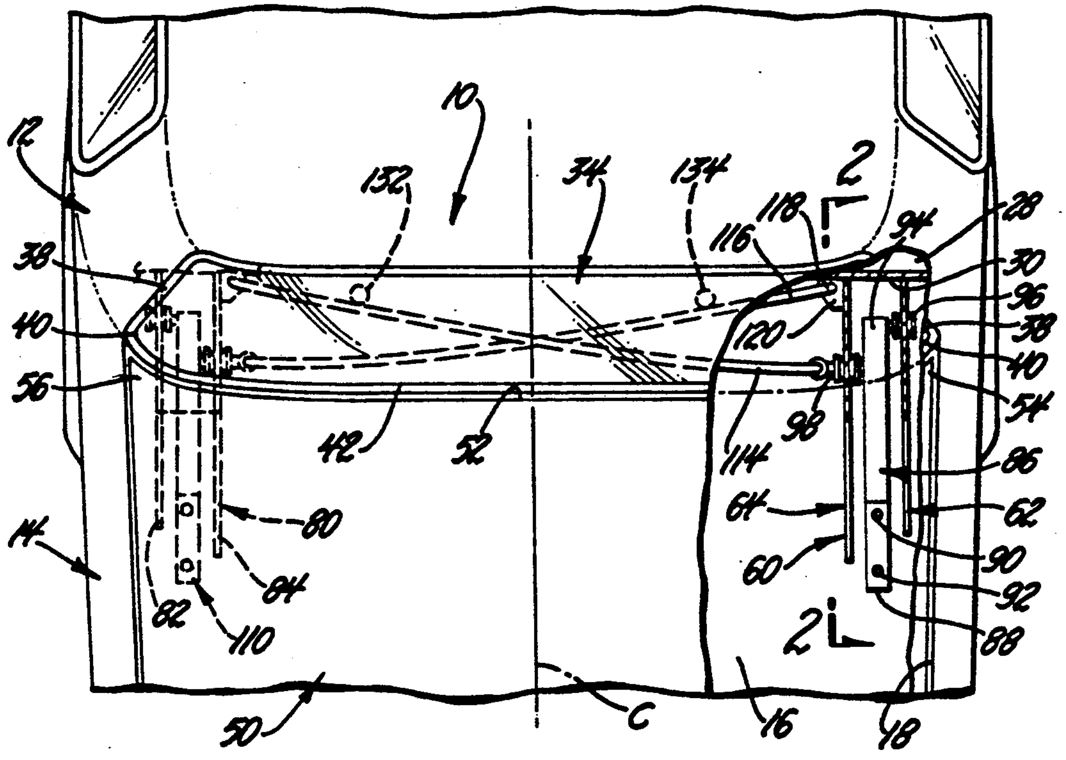
FIG. 1 is a fragmentary top view of a a vehicle having parts broken away and in section to show the hinge assembly in relation to the deck lid an the rear window. A second hinge assembly 15 shown in phantom.
Figure 2:
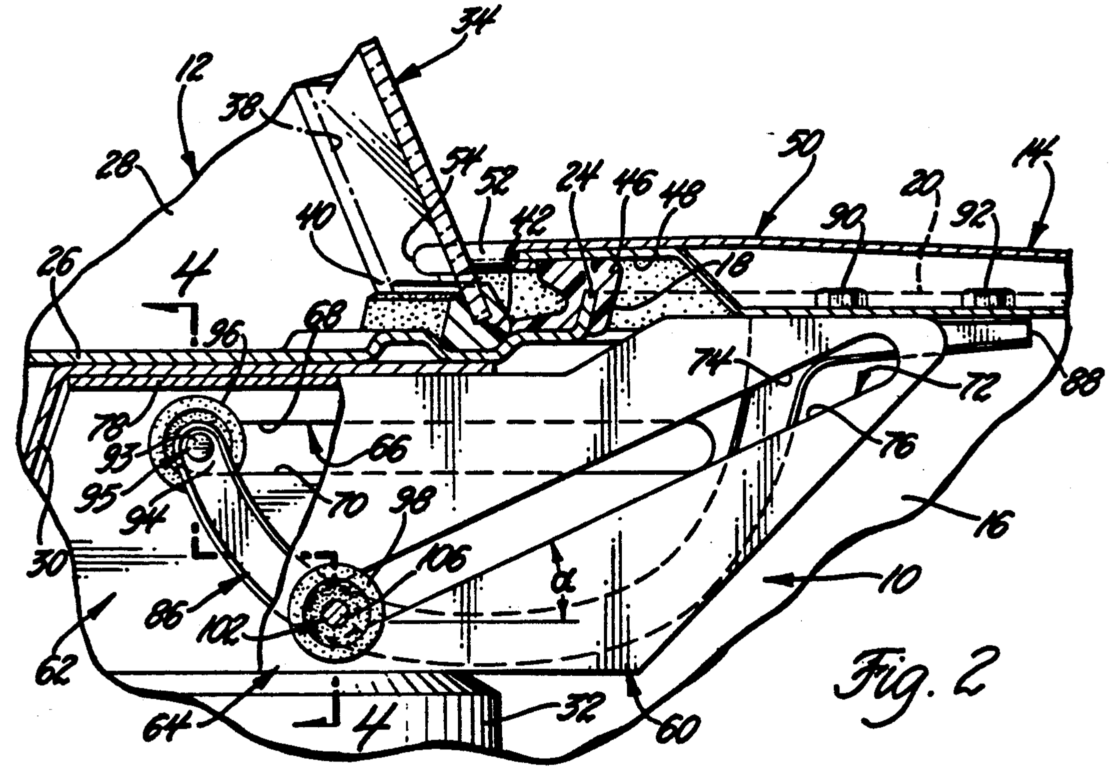
FIG. 2 is a sectional view taken in the directions of arrows 2—2 in FIG. 1 with the deck lid in the closed position.

Referring to FIG. 1, an automotive vehicle 12 has a body structure 14 with a luggage compartment or trunk 16. Referring to FIG. 2, an opening 18 allows access to the trunk 16 and is bordered by a pair of side flanges 20 and a forward flange 24. A shelf 26 and a rear wall 30 define a partition of the body structure 14 which separates the trunk 16 from a passenger compartment 28. A raised floor or suspension housing 32, which encases a portion of the shock absorber, is adjacent to the rear wall 30 as best seen in FIG. 2.

Figure 3:
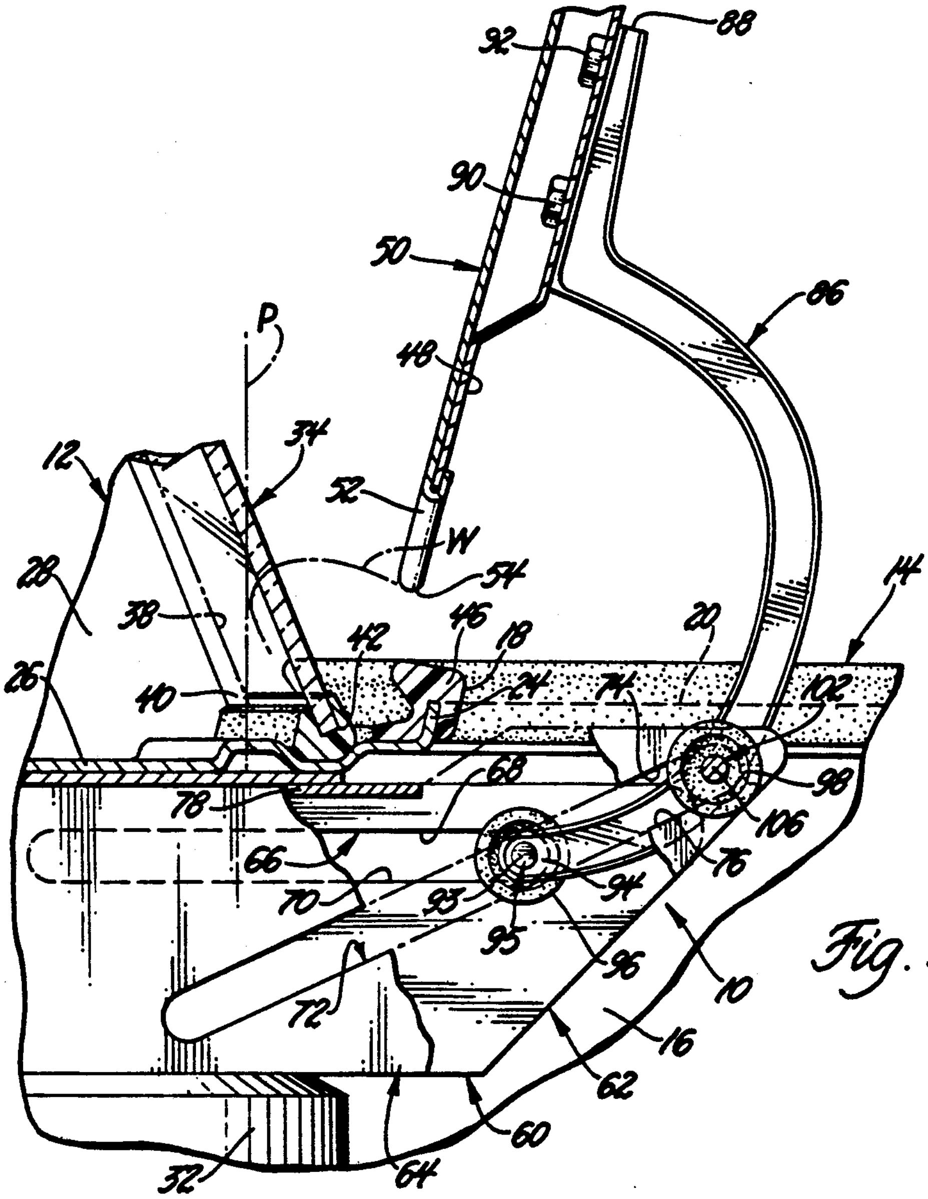
FIG. 3 is a view similar to FIG. 2 with the deck lid in the open position. A line in phantom shows the path of the wing tip of the deck lid.

Referring to FIG. 1, a rear window or backlite 34 is forward of the opening 18 and has both a curvature about a center line C of the vehicle 12 and slopes downward toward the trunk 16. A side edge 38 of the rear window 34 is shown in phantom in FIGS. 2 and 3. A vertical disposed reference line P is shown in FIG. 3 extending through a lower corner 40 of the rear window 34 where a lower edge 42 intersects the side edge 38.

A closure panel, or deck lid 50, covers the opening 18 when the deck lid 50 is in a closed position as shown in FIGS. 1 and 2. Referring to FIG. 1, the deck lid 50 has a leading or forward edge 52 that extends generally parallel to the lower edge 42 of the rear window 34. The deck lid 50 has a pair of wing tips 54 and 56 formed at the corners of the forward edge 52, in proximity to the lower corners 40 of the rear window 34.

Figure 4:
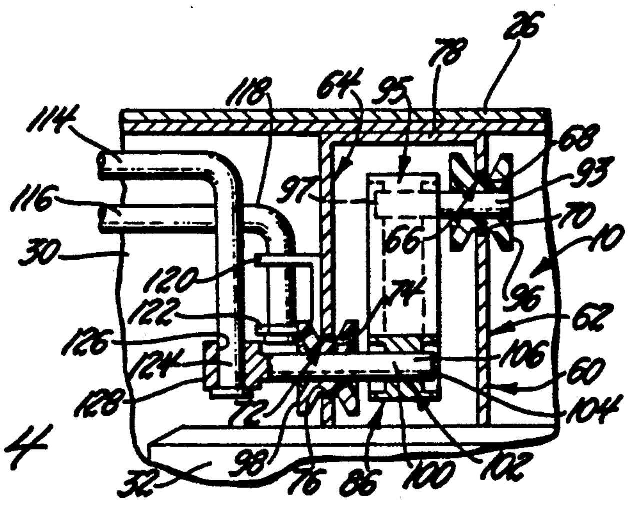
FIG. 4 is a sectional view taken in the direction of arrows 4—4 in FIG. 2.

Referring to FIGS. 2 and 4, a hinge assembly 10 rotatably retains the deck lid 50 to the body structure 14 and includes a U-shaped bracket 60 secured to the body structure 14 within the trunk 16. The bracket has a pair of plates 62 and 64 which are spaced apart by a plate 78 and depend downward towards the suspension housing 32. The plates 62 and 64 also project under the forward edge 52 of the deck lid 50. The first plate 62 has a guide slot 66 having an upper edge 68 and a lower edge 70 with the slot 66 extending generally horizontally under the shelf 26. The second plate 64, which is the same size as the first plate 62 and located inboard, has a second guide slot 72 having an upper edge 74 and a lower edge 76. The second guide slot 72 extends generally upward at an angle $\alpha$ of 25° as it extends rearward towards the opening 18 from a location in proximity to the suspension housing 32 and the rear wall 30 of the trunk 16.

A hinge strap 86 of a general gooseneck shape is interposed between the two plates 62 and 64 as seen in FIG. 4. Referring to FIG. 3, a first end 88 of the hinge strap 86 is secured to the deck lid 50 near the forward edge 52 by a set of fasteners 90 and 92. A first roller 96 is carried by a second end 94 of the hinge strap 86 by being mounted upon a shaft 93 of a support rod 95 having an end 97 attached to the hinge strap 86. The first roller 96 is made of molded nylon material which exhibits high abrasion and wear resistance combined with low friction and is slideably received by the guide slot 66 in the first plate 62, which acts as a path, as best seen in FIG. 2. This assembly comprises a sliding pivot.

A second roller 98 is mounted upon a shaft 100 of a support rod 102 having an end 104 attached to the hinge strap 86 at a connection point 106 located between the ends 88 and 94; however, the connection point 106 is closer in proximity to the lower end 94. The second nylon roller 98 is slideably received by the guide slot 72 of the second plate 64.

It is seen in FIG. 2 that the hinge assembly 10 fits compactly with an area between shelf 26, the rear wall 30, and the suspension housing 32. The upper end 88 of the hinge strap is the portion of the hinge strap 86 which extends the most rearward into the trunk 16 underlying the opening 18 when the deck lid 50 is in the closed position, as shown in FIG. 2.

Referring to FIG. 1, a torsion rod 114 spans across the trunk underlying the shelf 26 and has a first end secured to the body structure 14. Referring to FIG. 4, a second end 124 of the torsion rod 114 is received by a pocket 126 within an enlarged portion 128 of the support rod 102 so that the second end 124 of the torsion rod 114 is connected to the hinge strap 86. Referring to FIG. 1, a pin 132 projects downward from the shelf 26 to engage and imposes a bend in the torsion rod 114.

Referring to FIG. 1, a second hinge assembly has a second bracket 80 with a pair of plates 82 and 84. Like the first bracket 60, the inboard plate 84 has a guide slot set at an angle 25° and the outboard plate 82 has a horizontal guide slot. A hinge strap 110, similar to the first hinge strap 86, is mounted to the deck lid 50 with a pair of rollers received in the slots of the plates 82 and 84.

Referring to FIG. 1, a second torsion rod 116 similar to the first torsion rod 114 biases the second strap 110. As seen in FIG. 4, the second torsion rod 110 has a first end 118 secured to the body structure 14 by a pair of braces 120 and 122 carried on the second plate 64 of the first bracket 60. A second end of the second torsion rod 116 is attached to the hinge strap 110 of the second hinge assembly. In order to prevent interference of the torsion rods 114 and 116, the first torsion rod 114 is positioned slightly higher than the second torsion rod 116. Referring to FIG. 1, a pin 134 projects downward from the shelf 26 to engage and imposes a bend in the torsion rod 116.

The discussion of the operation of the deck lid 50 will refer to components of only the first hinge assembly 10. The second hinge assembly works identically.

In operation, a deck lid latch, not shown, is released allowing the deck lid 50 to open. The operator lifts the deck lid 50, with the torsion rod 114 assisting in this movement. As the rearward most edge, not shown, of the deck lid 50 rotates upward and forward, the wing tips 54 and 56 initially move generally upward. At the same time, the second roller 98 is pulled upward and rides against the upper edge 74 of the second guide slot 72. The first roller 96, which is set a fixed distance from the second roller 98 by the hinge strap 86, moves rightwardly in the first guide slot 66 tracking the second roller 98. The hinge strap 86 continues moving generally to the right and upward until the rollers 96 and 98 reach the end of the guide slots 66 and 72 as shown in FIG. 3. A curved phantom line W shows the path of the wing tips 54 and 56.

The torsion rod 114 imposes both a bending force and a torsion or twisting force on the hinge strap. The pin 132 defines a fulcrum condition for the bending force, whereas the first end of the torsion rod 114, connected to the body structure 14, defines a support or end condition for the torsion force. Both forces bias the second end 124 of the torsion rod 114 and the connected hinge strap 86 in an upward and rearward motion towards the opening 18 and the deck lid 50 towards an open position of FIG. 3.

The instantaneous center of the hinge assembly, defined as the intersection of the perpendiculars to the velocity or motion of the rollers 96 and 98, is forward of the wing tips as the deck lid initially moves from the closed position. With the instantaneous center forward of the wing tip, the wing tips move upward as the deck lid initially opens.

In closing the deck lid 50, the operator moves the rearward most edge of the deck lid 50 generally downward and rearward, the wing tips 54 and 56 initially move generally forward. At the same time, the second roller 78 is pushed downward and rides against the lower edge 76 of the second guide slot 72. The hinge strap 86 continues moving generally to the left and downward until the rollers 96 and 98 reach the end of the guide slots 66 and 72, shown in FIG. 2.

The second end of torsion rod 114, being pushed downward and towards the rear wall 30 by the movement of the second roller 98, is returned to the position shown in FIGS. 1 and 2, whereby the torsion rod 114 is ready to assist in the opening of the deck lid 50 when the deck lid latch is released.

It should be understood for purposes of the preceding description that the forward direction is to the left, and the rearward direction is to the right, although this would obviously be reversed if the hinge assembly were disclosed with an engine cover rather than a deck lid.

While one embodiment of the present invention has been explained, various modifications within the spirit and scope of the following claims will be readily apparent to those skilled in the art. For example, the preferred embodiment uses rollers for providing a convenient and low friction sliding pivot; other structures such as a pin riding in a slot could providing a sliding pivot. Likewise the embodiment discloses torsion rods to bias the hinge assembly; however, other bias means such as leaf springs could be used. In addition the slots disclosed in the preferred embodiment are rectilinear and of a specified orientation, the slots could also be curvilinear and vary in orientation of the slots so long as the hinge strap rotates.

The embodiments of the invention in which an exclusive property or privilege is claimed are defined as follows:

1. A hinge assembly for mounting a closure panel with an edge on a body structure of a vehicle, the hinge assembly comprising:
   - a pair of stationary guide paths carried by the body structure;
   - a hinge strap having a first end secured to the closure panel in proximity to the edge, a second end and a connection point located between the two ends;
   - first guide means carried by the second end of the hinge strap and slideably retained by one of the guide paths for slideable movement of the second edge of the hinge strap relative to the body structure; and
   - second guide means carried by the connection point of the hinge strap and slideably retained by the other guide path for slideable movement of the connection point relative to the body structure so that the hinge strap rotates relative to the body structure as the second end and the connection point of the hinge strap slideably moves whereby the opening movement of the closure panel will shift the edge of the closure panel away from the body structure.

2. In an automotive vehicle having a body structure and a closure panel movable from a generally horizontal closed position to an open position to access a compartment and the closure panel having a leading edge, a hinge assembly comprising:
   - a bracket mounted to the body structure and projecting under the leading edge of the closure panel, and the bracket having a pair of plates with each plate having a guide slot;
   - a hinge strap interposed between the two plates of the brackets having a first end secured to the closure panel near the leading edge and the hinge strap having a second end and a connection point located between the two ends;
   - a first guide means carried by the second end of the hinge strap and slideably received by one of the guide slots for slideable movement of the second end of the hinge strap relative to the body structure; and
   - a second guide means carried by the connection point of the hinge strap and slideably received by the other guide slot for slideable movement of the connection point relative to the body structure so that the hinge strap rotates relative to the body structure as the second end and the connection point of the hinge strap slideably move whereby as the closure panel moves from the closed position to the open position the leading edge of the closure panel shifts away from the body structure.

3. In an automotive vehicle having a body structure and a closure panel movable from a generally horizontal closed position to an open position to access a luggage compartment, and the closure panel having a forward edge that extends generally parallel to a lower edge of a window with the closure panel having a pair of wing tips formed at the corners of the forward edge in proximity to the lower corners of the window and a partition dividing the luggage compartment from a passenger compartment, and a compact area in the luggage compartment defined by the partition, the forward edge of the closure panel and a raised floor in the luggage compartment, a hinge assembly comprising:
   - a bracket mounted to the body structure in the compact area of the luggage area and projecting under the forward edge of the closure panel, and the bracket having a pair of plates depending downward with each plate having a guide slot;
   - a hinge strap of a general gooseneck shape interposed between the two plates of the bracket having a first end secured to the closure panel near the forward edge and the hinge strap having a second end and a connection point located between the two ends;
   - a first guide means carried by the second end of the hinge strap and slideably received by one of the guide slots for slideable movement of the second end of the hinge strap relative to the body structure;
   - a second guide means carried by the connection point of the hinge strap and slideably movement of the connection point relative to the body structure so that the hinge strap rotates relative to the body structure as the second end and the connection point of the hinge strap slideably move; and
   - a biasing means having a first end carried in the compact area of the luggage compartment by the body structure and a second end mounted to the second guide means for biasing the second guide means and the connected hinge strap in an upward and rearward motion whereby as the closure panel is opened the biasing means biases the second guide means upward and rearward in the other guide slot and the first guide means moves rearward in one of the guide slots moving the hinge strap generally to the rear and upward and the wing tips moving rearward away from the window.

4. A hinge assembly as in claim 3 wherein:
   - one of the guide slots extends generally horizontally and the other guide slot extends generally upward as it extends rearward from the partition and the raised floor towards the opening; and
   - the guide means are a pair of rollers, each roller mounted on a shaft carried by the hinge strap and the rollers are slideably received in the guide slots.

* * * * *